United States Patent [19]

Heins et al.

[11] 4,332,860
[45] Jun. 1, 1982

[54] AQUEOUS POLYMER DISPERSIONS FOR THE TREATMENT OF LEATHER

[75] Inventors: Ferdinand Heins, Erkrath; Wolfgang Speicher, Leverkusen, both of Fed. Rep. of Germany

[73] Assignee: Bayer Aktiengesellschaft, Leverkusen, Fed. Rep. of Germany

[21] Appl. No.: 256,844

[22] Filed: Apr. 3, 1981

Related U.S. Application Data

[62] Division of Ser. No. 081,101, Oct. 2, 1979, abandoned.

[30] Foreign Application Priority Data

Oct. 6, 1978 [DE] Fed. Rep. of Germany ....... 2843780

[51] Int. Cl.³ .......................... B32B 9/04; C08L 33/14
[52] U.S. Cl. .................................... 428/473; 427/389; 428/540; 524/547; 524/817
[58] Field of Search ..................... 260/29.7 H, 29.7 T; 526/287; 427/389; 428/473, 540

[56] References Cited

U.S. PATENT DOCUMENTS

| | | | |
|---|---|---|---|
| 2,828,220 | 3/1958 | McWherter et al. | 526/287 |
| 2,887,410 | 5/1959 | Graulich et al. | 260/29.7 T |
| 2,888,442 | 5/1959 | Uraneck et al. | 526/287 |
| 3,129,195 | 4/1964 | June et al. | 526/287 |
| 3,269,858 | 8/1966 | Mattei | 428/473 |
| 3,377,307 | 4/1968 | Kolb et al. | 260/29.7 T |
| 4,048,130 | 9/1977 | Brunold et al. | 260/29.6 NR |
| 4,256,809 | 3/1981 | Larsson et al. | 428/473 |

*Primary Examiner*—Harry Wong, Jr.
*Attorney, Agent, or Firm*—Connolly and Hutz

[57] ABSTRACT

Aqueous dispersions which are suitable for the treatment of leather and have a pH of from 2 to 7 and particle diameters of from 20 to 150 nm of polymers having a $T_{\lambda max}$-value below 20° C. of A from 20 to 70 parts by weight of one or more acyclic conjugated dienes having from 4–9 carbon atoms;

B from 10 to 40 parts by weight of acrylonitrile and/or methacrylonitrile;

C from 1 to 5 parts by weight of allylsulphonic acid and/or methallyl sulphonic acid or water-soluble salts thereof;

D less than 20 parts by weight of acrylic and/or methacrylic acid hydroxyalkylesters having from 2–4 carbon atoms in the hydroxyalkyl group; and E 0 to 40 parts by weight of acrylic and/or methacrylic acid alkyl esters having up to 8 carbon atoms in the alkyl group.

1 Claim, No Drawings

AQUEOUS POLYMER DISPERSIONS FOR THE TREATMENT OF LEATHER

This application is a division of application Ser. No. 081,101 filed Oct. 2, 1979, and now abandoned.

This invention relates to aqueous dispersions of polymers which are synthesised from acyclic conjugated dienes, (meth)acrylonitrile and (meth)acrylic acid alkyl esters in which the ester groups at least in part carry hydroxyl groups, and are stabilised by the copolymerization of (meth)allylsulphonic acid or water-soluble salts thereof, and to the use thereof for the treatment of leather.

In the conventional processes of emulsion polymerisation, nitrile rubber dispersions are obtained by polymerising a mixture of one or more acyclic conjugated dienes and (meth)acrylonitrile in an aqueous medium in the presence of anionic and/or non-ionic emulsifiers and initiators which give rise to free radicals. The mechanical stability of the rubber latices obtained is determined in particular by the nature and quantity of emulsifying agents.

It is known that the stability of such dispersions may be increased by the incorporation of mono-ethylenically unsaturated carboxylic acids, such as acrylic acid, methacrylic acid or itaconic acid, but such latices often have various disadvantages. Carboxylated nitrile rubber dispersions in most cases, show sufficient mechanical stability only at a pH of above 7, while below a pH of 7 they often do not have sufficient resistance to shear stresses, such as occur in the impregnation and priming of leather by spray application, swab application or casting, and they are frequently too sensitive to electrolytes and the addition of pigments. The subsequent dressing processes frequently necessitate the treatment of such latices in a neutral or acid medium because polymer films obtained from alkaline latices frequently lead to yellow or brown discolouration of interlayers containing nitrocellulose when used in the impregnation and priming of leather. Such yellowing is highly undesirable, particularly for dressing light coloured leather.

It is known that the latices obtained when using copolymerisable sulphonic acids or the water-soluble salts thereof are substantially more stable than those obtained when using monomers which carry carboxyl groups because sulphonic acid groups strongly dissociate even in an acid or neutral medium and ensure sufficient charging on the surface of the particles so that the corresponding latices have a higher stability in neutral and acid media.

It is also known to use leather binders based on one or more (meth)acrylic acid esters and (meth)acrylonitrile for increasing the resistance to swelling and resistance to solvents and for obtaining a dry, tack-free hand. In this connection, it has proved particularly advantageous to replace the (meth)acrylic acid esters partly or completely by an acyclic conjugated diene having from 4 to 9 carbon atoms, in particular butadiene-(1,3), because the polymer dispersions thereby obtained lead to films which have a lower glass transition temperature and the leather finally obtained therefore has a substantially improved cold flexibility after impregnation and priming.

It has now been found that especially advantageous impregnation and priming of leather is obtained if the aqueous binders used are dispersions having a pH of from 2 to 7 and particle diameters of from 20 to 150 nm of copolymers having a $T_{\lambda max}$ value below 20° C. of one or more acyclic conjugated dienes, (meth)acrylonitrile and one or more (meth)acrylic acid alkyl esters whose ester groups at least in part carry hydroxyl groups and (meth)allylsulphonic acid and/or water-soluble salts thereof. Latices of this monomer combination have a substantially increased mechanical stability and polymer films produced therefrom have improved adherence and, in particular, improved resistance to yellowing. The addition of (meth)acrylic acid hydroxyalkylesters also has the effect of producing a polymer containing functional groups which react with co-crosslinking agents, for example with di- and poly-functional methylol compounds, di- and poly-epoxides and di- and polyisocyanates, with the result that the fastness properties, in particular in the wet state, are improved.

The present invention thus relates to aqueous dispersions having a pH of from 2 to 7 and particle diameters of from 20 to 150 nm of polymers having $T_{\lambda max}$ value below 20° C. of:

(A) from 20 to 70 parts, by weight, of one or more acyclic conjugated dienes having from 4 to 9 carbon atoms;

(B) from 10 to 40 parts, by weight, of acrylonitrile and/or methacrylonitrile;

(C) from 1 to 5 parts, by weight of allylsulphonic acid and/or methallylsulphonic acid or water-soluble salts thereof;

(D) less than 20 parts, by weight of acrylic or methacrylic acid hydroxyalkylesters having from 2 to 4 carbon atoms in the hydroxyalkyl group; and (E) from 0 to 40 parts, by weight of acrylic and/or methacrylic acid alkyl esters having up to 8 carbon atoms in the alkyl group.

The following are examples of suitable acyclic conjugated dienes having from 4 to 9 carbon atoms: butadiene-(1,3); 2-methylbutadiene-(1,3) (isoprene); 2,3-dimethylbutadiene-(1,3); piperylene; 2-neopentylbutadiene-(1,3) and other substituted dienes, such as 2-chlorobutadiene-(1,3) (chloroprene); 2-cycanobutadiene-(1,3) and substituted straight-chain conjugated pentadienes and straight- or branched-chain hexadienes. Butadiene-(1,3) is the preferred monomer by virtue of its exceptional capacity for copolymerising with (meth)acrylonitrile.

Suitable hydroxyalkylesters include, for example, mono-esters of acrylic and/or methacrylic acid and glycols having from 2 to 4 carbon atoms, such as ethylene glycol, propane diol-(1,2) and butane diol-(1,2). The hydroxyalkylesters are used in quantities of less than 20 parts, by weight, preferably from 5 to 15 parts, by weight. Quantities of approximately 10 parts, by weight, are generally sufficient to produce a copolymer having the desired properties.

The following are examples of (meth)acrylic acid alkyl esters: methyl, ethyl, n-propyl, isopropyl, n-butyl, isobutyl and 2-ethylhexyl-(meth)acrylate.

Up to 20 parts, by weight of the water-insoluble monomers may be replaced by one or more copolymerisable monomers, in particular by α,β-monoethylenically unsaturated mono- and di-carboxylic acids, such as acrylic acid, methacrylic acid, itaconic acid, fumaric acid and maleic acid, mono-esters of these dicarboxylic acids, such as monoalkyl-itaconate, fumarate and maleate, di-esters of alkane diols and α,β-mono-ethylenically unsaturated mono-carboxylic acids, such as ethylene glycol diacrylate and butane diol-1,4-diacrylate, amides of these unsaturated mono- and di-carboxylic acids, such as acrylamide and methacrylamide and the corresponding N-methylol compounds, and N-alkoxymethyl- and N-acyl-(meth)acrylamides having from 1 to 4 carbon atoms in the alkyl groups, for example, N-methoxymethyl-(meth)acrylamide, N-n-butoxymethyl-(meth)acrylamide and N-acetoxymethyl-(meth)acrylamide. Other suitable comonomers include aromatic vinyl compounds in which the vinyl groups are directly attached to nuclei having from 6 to 10 carbon atoms, for example, styrene, substituted styrene, such as mono- and di-alkylsubstituted styrenes, α-methylstyrene, 2,4-divinylbenzene, halogen-substituted styrenes and vinylnaphthalene; also, vinyl esters of carboxylic acids having from 1 to 18 carbon atoms, in particular vinyl acetate and vinyl propionate, vinyl chloride and vinylidene chloride, vinyl ethers, such as vinyl methyl ether, vinyl ketones, such as vinyl ethyl ketone, and heterocyclic monovinyl compounds, such as vinylpyridine.

The polymer dispersions according to the present invention are eminently suitable for the impregnation and priming of leather if the particle diameters are from 20 to 150 nm. The methods employed for the preparation of finely divided latices are known those skilled in the art and have been described, for example in Houben-Weyl, Methoden der organischen Chemie, Volume XIV/1, publishers Georg Thieme Verlag, Stuttgart, 1961, pages, 335 and 375 et seq. The reason why adjustment of the particle diameter to from 20 to 150 nm is particularly important is that it ensures sufficient penetration of the leather.

Determination of the particle diameter is normally carried out by determining the particle size distribution of the polymer dispersions by means of electron microscopy, ultracentrifugation or gel chromatography. So-called "particle size distribution curves" are obtained in which, for example, the particles of equal diameter per unit volume are counted, the percentage thereof in the total number of particles is determined and the figures obtained are plotted against the corresponding particle diameters (differential particle size distribution). According to this method, the particle size distribution curves of the latices according to the present invention should be from 20 to 150 nm.

Optimum properties for practical application may also be obtained with the polymer dispersions according to the present invention by adjusting the $T_{\lambda max}$ value of the polymer to below 20° C., preferably to somewhere within the range of from +5° to −15° C. This value is determined by a torsion vibration test (DIN 53 445) carried out on the polymer film obtained by evaporation of the water and serves to characterise the softening range of the polymer (see also I. Williamson, British Plastics 23, 87 (September, 1950).

The copolymer dispersions according to the present invention are prepared by known methods of emulsion polymerisation, using the conventional initiators and emulsifiers of the anionic and/or non-ionic type. Suitable initiators include, for example, inorganic peroxo-compounds, such as hydrogen peroxide, sodium, potassium and ammonium peroxodisulphate, peroxocarbonates and borates peroxyhydrates, as well as organic peroxo-compounds, such as acylhydroperoxides, diacylperoxides, alkyl hydroperoxides and dialkylperoxides and esters, such as t-butylperbenzoate, and mixtures of inorganic and organic initiators. The quantities of initiators used are generally from 0.01 to 5% by weight, based on the total quantity of monomers put into the process.

The inorganic and organic peroxo-compounds mentioned above may also be used in conjunction with one or more suitable reducing agents in known manner. Examples of such reducing agents include sulphur dioxide, alkali metal disulphites, alkali metal and ammonium hydrogen sulphites, thiosulphates, dithionite and formaldehyde sulphoxylate, hydroxylamine hydrochloride, hydrazine sulphate, iron (II) sulphate tin (II) chloride, titanium (III) sulphate, hydroquinone, glucose and ascorbic acid.

Examples of anionic emulsifiers include long-chain fatty alcohol sulphates, long-chain alkylsulphonates and alkyl arylsulphonates and the condensation products thereof with formaldehyde, long-chain hydroxyalkylsulphonates, salts of sulphosuccinic acid esters and sulphated ethylene oxide adducts.

The non-ionic emulsifiers used may include, for example, the known reaction products of ethylene oxide with fatty alcohols, such as lauryl, myristyl, cetyl, stearyl and oleyl alcohol, with fatty acids, such as lauric, myristic, palmitic, stearic and oleic acid, and the amides thereof, and with alkylphenols, such as isooctyl, isononyl and dodecylphenol. The reaction products of ethylene oxide with isononyl, dodecyl and tetradecylmercaptan and long-chain alkylmercaptans and long-chain alkylthiophenols or analogous reaction products of etherified or esterified long-chain polyhydroxyl compounds, such as sorbitol monostearate, may also be mentioned as examples. These compounds are in all cases reacted with from 4 to 60 or more mols of ethylene oxide. Block copolymers of ethylene oxide and propylene oxide having at least one mol of ethylene oxide may also be used.

The above-mentioned emulsifiers are generally used in quantities of from 0.5 to 20 parts, by weight, based on the total quantity of monomers put into the process.

It is frequently advisable to carry out the emulsion polymerisation in the presence of buffers, chelating agents, promoters and similar additives. The type and quantity thereof to be used are well known to those skilled in the art.

Chain-transfer agents, such as tetrabromomethane, tetrabromoethane, alcohols, long-chain alkyl mercapto and dialkyldixanthates, may also be used in the polymerisation process.

Polymerisation is suitably carried out at temperatures of from 10° to 60° C.; the pH should be from 2 to 7.

Dispersions having a solids content of from 1 to 65%, by weight may be prepared by this method although latices having solids contents of from 30 to 50%, by weight, are normally used.

Due to the stabilisation of the latex particles by sulphonate groups, which ensure adequate charging of the particle surface, the latices according to the present invention have a substantially higher stability to shearing forces than polymer particles which have been stabilised by adsorption of emulsifier molecules. Compared with carboxylated nitrile rubber dispersions which contain emulsifiers, binders according to the present invention have a substantially increased mechanical stability at a pH of from 2 to 7. This is found to be particularly advantageous in the application of the latices to leather by casting, spraying or swabbing. Furthermore, the incorporation of the highly polar (meth)allylsulphonic acid or water-soluble salts thereof results in a substantial improvement in the adherence to the leather, and the generally marked tendency to yellowing of polymer films obtained from nitrile rubber latices is reduced. The adhesion is further increased by the copolymerisation of hydroxyalkylesters of (meth)acrylic acid and a reversible water absorption capacity is obtained.

In addition to the ease with which they may be processed, the latices according to the present invention are distinguished by the fact that films thereof have a dry hand, good adherence to leather and substantially improved cold flexibility compared with films obtained from pure polyacrylate dispersions.

The treatment may be carried out on various full grained, buffed or split leathers of various origins. Tanning of the leather is preferably already adjusted to the subsequent dressing treatments. The grain is generally lightly buffed to correct any fault in the grain and improve adherence of the dressing. After removal of the buffing dust, the leather is impregnated and primed to strengthen the grain, fill the gaps in the fibre network and seal the surface. The impregnation which strengthens the grain is generally carried out using the dilute polymer dispersions according to the present invention, optionally with the addition of auxiliary substances to assist penetration, while the primer liquor already contains an aqueous pigment preparation in addition to these components. Priming is generally carried out several times and the leather is ironed or embossed to produce a grain between the individual applications. After drying, finishing proper is carried out.

Particularly important for the finishing process, apart from the ability of the binders according to the present invention to be cross-linked by heat, is the reactivity thereof with suitable reagents, in particular with formaldehyde and other aldehydes, such as glyoxal, and with N-methylol compounds, such as dimethylolurea and hexamethylol melamine. Furthermore, these polymers may be cross-linked using low and high molecular weight di- and poly-epoxides and with di- and poly-isocyanates, for example, with tolylene-2,4-diisocyanate, tolylene-2,6-diisocyanates, naphthalene-1,5-diisocyanate, diphenylmethane-4,4'-diisocyanate and polymeric isocyanates obtained from polyhydric alcohols by reacting them with an excess of polyisocyanates. Masked isocyanates may also be used, e.g. reaction products of isocyanates with phenols, malonic esters and acetoacetic esters.

For this reason, the latices according to the present invention are also eminently suitable for use as primer binders for patent leather in which priming is followed by a finishing treatment using reactive lacquers of polyfunctional isocyanates and compounds which have reactive hydrogen atoms, such as polyesters and polyethers having free hydroxyl groups. The reaction of the primer with the lacquer subsequently applied results in excellent adherence under mechanical stress and exposure to water and organic solvents and excellent flexibility in the dry and wet state and hence a finished article which is easy to care for and has a pleasant hand and good grain and is well sealed. These patent leathers may be used, for example, as shoe upper leathers and for the manufacture of bags, garments and fine quality leather goods.

The following Examples serve to explain the process according to the present invention. The percentages are in all cases percentages, by weight.

1. PREPARATION OF THE POLYMER DISPERSIONS

Example 1 (Latex A)

A mixture of 300 g of ethoxylated isononylphenol having 15 ethylene oxide units, 200 g of a sodium sulphonate of a mixture of long chain paraffin hydrocarbons having an average chain length of 15 carbon atoms, 10 g of tetra-sodium ethylene diaminotetraacetate, 25 g of a 1% solution of iron (II) sulphate heptahydrate and 50 g of t-dodecylmercaptan in 16,300 g of water is introduced into a 40-liter stainless steel autoclave equipped with cross blade agitator, and the mixture is adjusted to pH 3.0 using 1 N sulphuric acid.

200 g of a 25% aqueous solution of sodium methallyl sulphonate, 2900 g of acrylonitrile and 1500 g of propylene glycol-1-methacrylate are then added, the autoclave is evacuated and the pressure is equallised with nitrogen and 5300 g of butadiene-(1,3) are forced in. After heating to 25° C., polymerisation is started with 20 g of 80% t-butylhydroperoxide in 100 g acrylonitrile and 10 g of sodium formaldehyde sulphoxylate dihydrate in 500 g of water. At a solid concentration of 10, 20, and 30%, respectively, a solution of 200 g of a 25% aqueous solution of sodium methallylsulphonate, 150 g of ethoxylated isononylphenol, 20 g of sodium paraffin sulphonate and 3 g of sodium formaldehyde sulphoxylate dihydrate in 1000 g of water is forced in and the temperature is gradually raised to 40° C. in the course of polymerisation until a concentration of 35.4% is finally obtained. At a solids concentration of 33%, the reaction mixture is reactivated with a solution of 20 g of ammonium peroxodisulphate in 100 g of water and 20 g of sodium disulphite in 100 g of water. When the final concentration is reached, 200 g of a 50% phenolic age-resistor emulsion are added and the dispersion is freed from residual monomer at 50° C. under vacuum. A latex which is virtually free from coagulate and specks is obtained. It has a solids concentration of 36.2%. A pH of 3.2 and a particle diameter distribution of from about 90 to 130 nm. A polymer film formed from this latex is found by a torsion vibration test (DIN 53 445) to have a $T_{\lambda max}$ value of approximately 2° C. (frequency: 1.6 Hz).

COMPARISON EXAMPLE 1 (COMPARISON LATEX A)

Example 1 is repeated, but with replacement of the acrylonitrile by methyl methacrylate. A coagulate and speck-free latex having a solids content of 34.8% and a pH of 2.8 is obtained. The particle diameters range from ca. 70 to ca. 100 nm. A polymer film formed from this latex has a $T_{\lambda max}$ value of ca. $-11°$ C. (frequency: 0.9 Hz).

COMPARISON EXAMPLE 2 (COMPARISON LATEX B)

Example 1 is repeated, but with the replacement of sodium methallyl sulphonate by methacrylic acid. The latex obtained is free from specks, but contains small quantities of coagulate which may easily be filtered off. The solids content is 34.7%, the pH 3.4. The particle diameters are from about 60 to 90 nm. A polymer film formed from the latex has a $T_{\lambda max}$ value of ca. 4° C. (frequency: 1.9 Hz).

COMPARISON Example 3 (COMPARISON LATEX C)

Example 1 is repeated, but with replacement of the propylene glycol-1-methacrylate by methyl methacrylate. A virtually coagulate and speck-free latex having a solids concentration of 35.5%, a pH of 3.1 and a particle diameter distribution of from about 50 to 90 nm is obtained. A polymer film formed from the latex has a $T_{\lambda max}$, value of ca. 2° C. (frequency: 2.0 Hz).

COMPARISON EXAMPLE 4 (COMPARISON LATEX D)

1000 g of oleic acid and 500 g of potassium hydroxide are dissolved in 14500 g of water at 80° C. in a stainless steel 40 l reactor equipped with cross blade agitator, and a solution of 50 g of the sodium salts of condensation products of 2-naphthalensulphonic acid and formaldehyde in 1500 g of water is added. After cooling to 25° C., the autoclave is charged with 3000 g of acrylonitrile, 1500 g of propylene glycol-1-methacrylate, 800 g of a 25% aqueous solution of sodium methallylsulphonate and 50 g of t-dodecylmercaptan. After evacuation and pressure equalisation with nitrogen, 5300 g of butadiene-(1,3) are forced in and polymerisation is initiated at 25° C., using solutions of 50 g of potassium peroxOdisulphate in 1000 g of water and 20 g of sodium disulphite in 500 g of water. The temperature is gradually raised to 40° C. during polymerisation and the pH is maintained above 9.0 by the addition of 30 ml of 25% potassium hydroxide solution. When a concentration of approximately 30% is reached, a solution of 40 g of potassium peroxodisulphate in 800 g of water and a solution of 20 g of sodium disulphite in 600 g of water and 250 g of a 20% solution of potassium hydroxide are added. When a final concentration of 34.3% is reached, 200 g of a phenolic age-resister emulsion are added and the dispersion is freed from residual monomers at 50° C. under vacuum. A virtually coagulate and speck-free latex having a solids concentration of 36.4% and a pH of 8.9 is obtained. The particle diameters are from about 40 to 80 nm. A polymer film prepared from the latex has a $T_{\lambda max}$ value of ca. $-5°$ C. (frequency: 1.7 Hz).

2. TREATMENT OF LEATHER

The polymer dispersions prepared according to Example 1 and comparison Examples 1 to 4 are used for the treatment of leather. The comparison shows the advantageous properties for practical application of the polymer dispersions which have the monomer composition according to the present invention.

EXAMPLE 1

A liquor having the following compositions is applied by hand to a chrome calf leather:
 130 parts, by weight of an aqueous casein top coat dye,
 400 parts, by weight, of water,
 160 parts, by weight, of latex A.

This liquor is applied to the leather by swabbing in three applications with intermediate drying. After the first application, the leather is ironed in a hydraulic press at temperature of 60° C. A two-component polyurethane lacquer having a solids content of approximately 35% dissolved in organic solvents is then applied to this primed leather by spraying.

The resulting lacquered leather is then dried in a horizontal position at temperatures of from 20° to 40° C. for from 8 to 10 hours. A polyurethane patent leather which has good fastness properties is obtained. In the flexibility test in the Bally Flexometer, no cracks are observed after 50,000 foldings. The adherence of the polyurethane lacquer film to the primer is also found to be free from fault when the leather is tested in the dry state and moistened with acetone.

COMPARISON EXAMPLES

Samples of similar chrome calf leather are treated in the same way as in Example 1 in comparison experiments, but using aqueous primer liquors in which latex A is replaced by comparison latices A, B and C. Lacquering and drying of the leather is carried out as Example 1. When tested for adherence in the dry state and moistened with acetone, the patent leathers obtained show insufficient bonding between the primer and the polyurethane lacquer since the layer of lacquer may be peeled off with a knife.

EXAMPLE 2

A chrome neat's leather which has been retanned using synthetic tanning substances and lightly buffed using buffing paper is primed with an aqueous primer having the following composition:
 130 parts, by weight, of an aqueous casein covering dye containing titanium dioxide as pigment,
 150 parts, by weight, of water,
 160 parts, by weight, of latex A.

The viscosity of the priming liquor is adjusted by dilution so that the liquor has an outflow time of approximately 22 seconds in a Ford cup having an outflow nozzle of 4 mm diameter.

The primer composition is applied to the leather in a casting machine in a quantity of 160 g/m², or in two applications of 80 g/m² each. After drying of the primer, a light application of lacquer or of an aqueous emulsion based on nitrocellulose is sprayed on the leather to improve subsequent embossing. The leather is then embossed in a hydraulic press at 70° C., e.g. to impart a grain of pores or of shrunk leather. Lacquering with a two-component polyurethane lacquer and drying of the lacquer are carried out as in Example 1.

The polyurethane patent leather obtained is distinguished by its good fastness properties, particularly its flexibility and adhesion. In the shoe manufacturing operations involving the action of heat, e.g. drying with hot air and ironing, no yellowing is observed.

EXAMPLE 3

Leather material and method of priming and lacquering are the same as in Example 2. The only difference is that in the primer composition described there, latex A is replaced by an alkaline comparison latex D. The fastness values of the polyurethane patent leather obtained (flexibility and adhesion) are as good as in Example 2, but when the leather is exposed to heat during manufacture of shoes, yellowing occurs due to partial degradation of the intermediate layer of nitrocellulose as a result of the alkaline reaction of the binder used for the priming composition.

We claim:

1. A method of treating leather comprising applying to said leather an aqueous dispersion having a pH of from 2 to 7 and particle diameters of from 20 to 150 nm of polymers having a $T_{\lambda max}$ value below 20° C. of:

(A) from 20 to 70 parts, by weight, of one or more acyclic conjugated dienes having from 4 to 9 carbon atoms;

(B) from 10 to 40 parts, by weight of acrylonitrile and/or methacrylonitrile;

(C) from 1 to 5 parts, by weight of allylsulphonic acid and/or methallyl sulphonic acid or water-soluble salts thereof;

(D) from 5 to 15 parts, by weight of acrylic and/or methacrylic acid hydroxyalkylesters having from 2 to 4 carbon atoms in the hydroxyalkyl group; and (E) 0 to 40 parts, by weight, of acrylic acid and/or methacrylic acid alkyl esters having up to 8 carbon atoms in the alkyl group.

* * * * *